Aug. 22, 1950   A. W. FAULKNER   2,519,553
RADIO APPARATUS FOR AIRCRAFT
Filed Sept. 24, 1948   2 Sheets-Sheet 1

INVENTOR
Arundell Wallis Faulkner
By Richardson and David
his Attys.

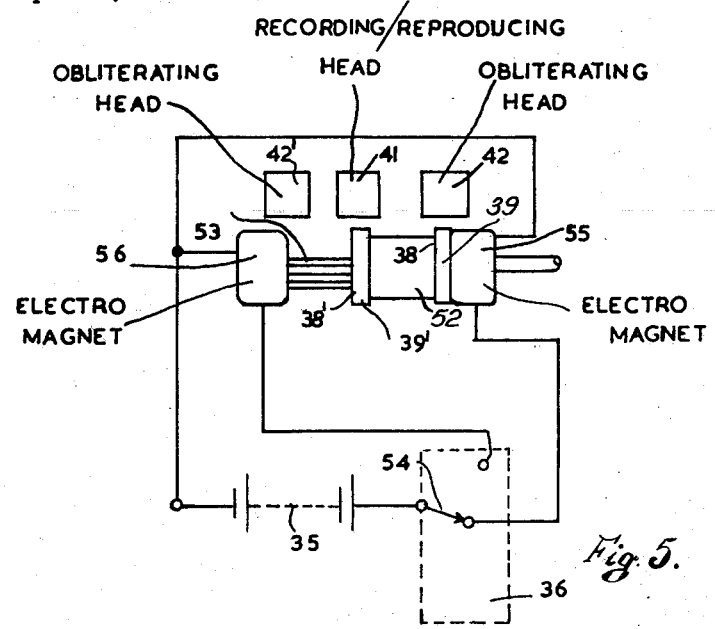
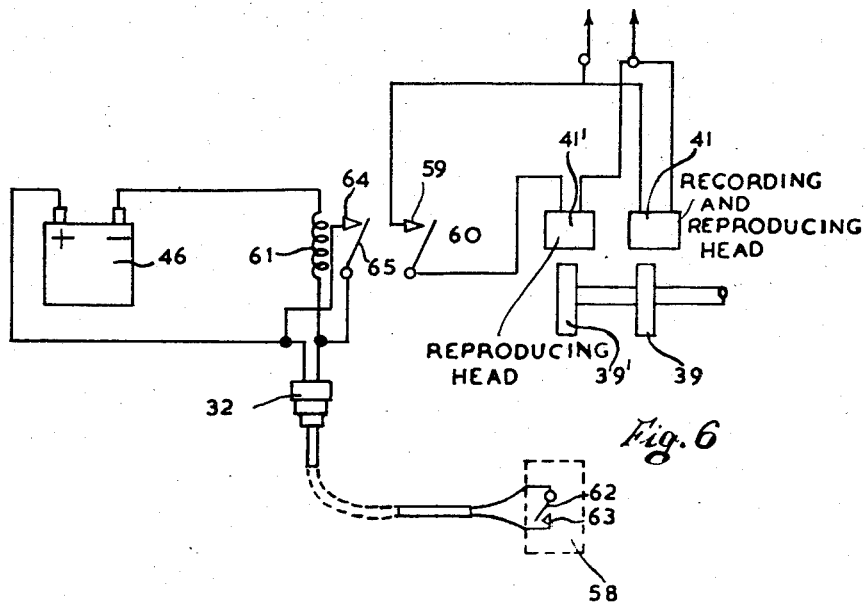

Patented Aug. 22, 1950

2,519,553

UNITED STATES PATENT OFFICE 2,519,553

RADIO APPARATUS FOR AIRCRAFT

Arundell Wallis Faulkner, Woking, England

Application September 24, 1948, Serial No. 51,029
In Great Britain November 27, 1946

1 Claim. (Cl. 250—17)

This invention is concerned with emergency radio apparatus for use in summoning assistance to aircraft which have crashed unobserved by persons on the ground, the apparatus comprising a unit capable of being jettisoned from the aircraft and provided with a signal record and a radio transmitter for transmitting the recorded signal automatically after the unit has been jettisoned.

An object of this invention is to give a reasonable chance that, when an aircraft has been forced down and possibly seriously damaged, S O S signals indicating approximately its position will be transmitted for a considerable period after the accident, irrespective of whether the machine has alighted on land or water.

Figure 1:
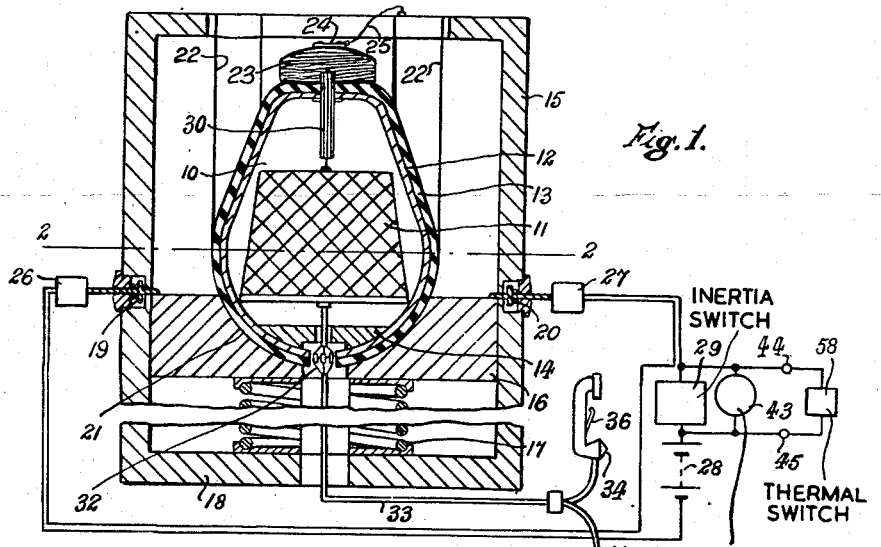
Figure 2:
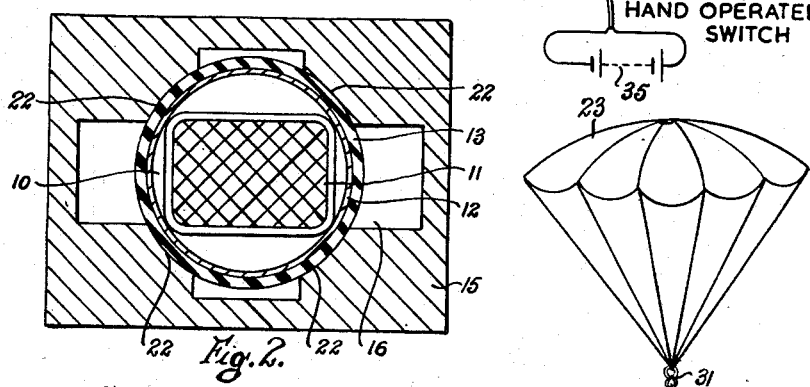
Figure 3:
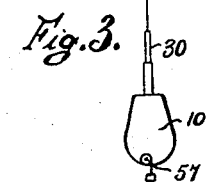
Figure 4:
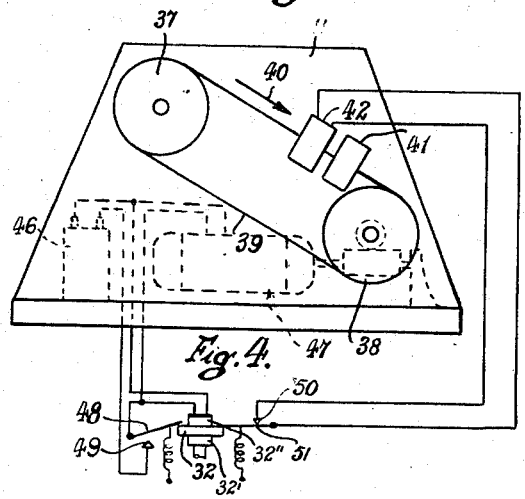

Embodiments of the invention will now be described, by way of example, with reference to the accompanying diagrammatic drawings, in which:

Fig. 1 is a cross-sectional elevation of a recording and transmitting unit to be jettisoned located in a spring-loaded catapult device, Fig. 2 is a cross-sectional plan of the embodiment taken at 2—2 in Fig. 1, Fig. 3 is a sketch illustrating the recording and transmitting unit of Fig. 1 descending by means of a parachute after being jettisoned by the catapult device of Fig. 1, Fig. 4 is a sketch of recording apparatus suitable for use in the embodiment of Fig. 1, and Figs. 5 and 6 are sketches illustrating alternative arrangements to that shown in Fig. 4.

Throughout the drawing like parts are given the same references.

Referring to Figs. 1 and 2 a recording and transmitting unit 10 to be jettisoned comprises recording and transmitting apparatus 11 located within a container 12 of egg shape. The container 12 is provided with a shock-absorbing rubber sheath 13 for the purpose of protecting the unit when catapulted and when touching down. It is arranged, for example by means of lead 14 fixed in the bottom of the container 12, that the unit 10 tends to assume an upright position, as shown in the drawing, when resting upon a level surface. It is also arranged that the unit 10 is buoyant and floats in an upright position.

For the purpose of jettisoning the recording and transmitting unit 10, there is provided a catapult device comprising a frame 15 and a piston 16 mounted to be slidable vertically therein, a coil-spring 7 being disposed between the lower surface of the piston 16 and the base 18 of the frame 15.

Before the unit 10 is placed in position in the catapult device the piston 16 is depressed by any suitable means to compress the spring 17. When the piston 16 is depressed by a predetermined amount two spring-loaded catches 19 and 20 lock it automatically in its depressed position.

The unit 10 is then loaded into the catapult from the top, the upper surface of the piston 16 containing a depression 21 shaped to fit the lower, semi-spherical portion of the unit, and guide surfaces 22 being provided in the frame 15 to facilitate loading and ejection of the unit 10.

A parachute pack 23 is fitted to the top of the unit 10 and a parachute release pin 24 is connected by means of a steel wire 25 to the frame 15 after the unit 10 is loaded.

The catches 19 and 20 are released by two electro-magnetic release units 26 and 27 respectively which are automatically energised from a battery 28 by an inertia-type crash switch 29 which may be located in any convenient position in the aircraft.

When the catches 19 and 20 are released the unit 10 is jettisoned vertically upwards clear of the aircraft by means of the piston 16 and spring 17. As the unit passes out of the frame 15 the parachute release pin 24 is automatically withdrawn and the parachute opens a short time after ejection of the unit 10 takes place.

The unit 10 includes a telescopic aerial 30 which is attached to the parachute 23.

Fig. 3 illustrates the unit 10 descending by means of the parachute 23. As will be seen the telescopic mast 30 is extended during the descent, this being arranged to occur automatically by the pull of the parachute 23. The parachute 23 is attached to the top of the aerial 30 by means of a coupling unit 31, e. g. of the scissor-hook type, adapted, after having been loaded, to disengage automatically as a result of the unit's touching down.

Referring again to Fig. 1, when the unit 10 is loaded a connection is made, by means of a plug-and-socket connector 32 and a cable 33, from the recording and transmitting apparatus 11 to a navigator's microphone 34 and a battery 35. The apparatus 11 contains a battery 46 and driving motor 47 (Fig. 4) for use when the unit 10 is jettisoned. In order to obtain the maximum duration of transmission after ejection, a portion of the plug-and-socket connector 32 is arranged, for example as shown in Fig. 4, to disconnect the internal battery when the unit 10 is loaded, and to connect the external battery 35 in its place. As shown in Fig. 4 a movable contact arm 48 is lifted from a fixed contact 49 when the plug portion 32' of the connector 32 is inserted into the socket portion 32". In this way the battery 46 is disconnected from the motor 47. Current is then supplied to the motor 47 through the connector 32. Ejection of the unit 10 results in the disconnection of the plug from the socket in the connector 32 and in the reconnection of the internal battery 36 to the motor 47 through the contacts 48 and 49.

During normal flight the navigator records at regular intervals his position, the time and an adjacent fixed reference point if available. In making these recordings he first of all presses a switch 36 associated with his microphone 34. The switch 36 starts the motor in the apparatus 11 and applies the necessary voltages to the recording section thereof. After each recording the navigator releases the switch 36 and thereby stops the motor and disconnects the battery 35 from the recording apparatus.

Fig. 4 is a diagrammatic sketch of suitable recording apparatus for use in the unit 10 of Figs. 1 to 3. The recording apparatus comprises two motor-driven reels 37 and 38 around which is passed a single endless record 39 of plastic tape filled with magnetic particles. The tape 39 is driven in the direction of the arrow 40 and before it passes through a recording and pick-up head 41, information previously recorded thereon is obliterated by means of an obliterating head 42 disposed adjacent the recording head. The length of the tape 39 is arranged to be such that at all times the latest complete recording is available for transmission, together with a subsequent incomplete recording, if any. In order to ensure this in most cases, the tape is preferably made three times the length required for one recording of normal duration. When the unit 10 is jettisoned the obliterating head is disconnected automatically from the circuit, by the opening of contacts 50 and 51 (Fig. 4), whereby all the information contained in the recording tape 39 is transmitted repeatedly until the internal battery 46 is exhausted.

In making the recordings the navigator may preface each report by the international S O S signal. Alternatively, if the report signal, as well as being recorded, is being transmitted immediately as a routine report, the S O S signal may be maintained permanently recorded and arranged in any suitable manner to preface automatically the recorded signals to be transmitted by the unit in an emergency.

A manually operable switch 43 (Fig. 1) may be connected in parallel with the inertia switch 29, whereby the navigator or other member of the crew can jettison the unit 10 when desired, or in the event of failure of the switch 29. Other switches, such as wing-tip and nose trip-switches may be connected to two terminals 44 and 45 and hence in parallel with the switches 29 and 43.

Instead of using a single tape 39 (Fig. 4) two or more records may be arranged to co-operate selectively with the recording and obliterating head, in response to the operation of the switch 36, as shown in Fig. 5. The two tapes are shown at 39 and 39' passed around the reel 38 and reel 38' respectively. The reels 38 and 38' are mechanically connected by a tubular member 52 which is internally splined to be slidable on a splined shaft 53. A single pole two-way switch 54 forming part of the switch 36 is arranged to apply voltage from the supply 35 alternatively to electro-magnets 55 and 56. When the magnet 55 is energised as shown in the drawing the reels 38 and 38' move to a right-hand position in which the tape 39 co-operates with the obliterating head 42 and the tape 39' co-operates with the recording and reproducing head 41. When the magnet 56 is energised the reels 38 and 38' move to a left-hand position where the tape 39' co-operates with an obliterating head 42' and the tape 39 co-operates with the recording and reproducing head 41.

In a further modification, a reel of wire is fixed to the base of the unit 10 as shown at 57 in Fig. 3 and is released when the unit 10 touches down so as to have an anchoring effect in water.

It may be required to jettison the unit in the event of a fire breaking out. In this case suitable thermal switches of which one is shown at 58 in Fig. 1 may be located in suitable positions, for example just inside the pilot's cabin and near the wing roots. By connecting a pair of contacts on each thermal switch to the terminals 44 and 45 is can be arranged that the unit is jettisoned when any one of the thermal switches attains a predetermined temperature.

Furthermore an auxiliary record can be left permanently in the unit, and switched into circuit by additional contacts on the thermal switches as shown in Fig. 6. In this figure the two tapes 39 and 39' co-operate respectively with the recording and reproducing head 41 and a reproducing head 41' respectively. The head 41' is connected in parallel with the head 41 through contacts 59 and 60 of a relay 61. This relay is actuated by contacts 62 and 63 of the thermal switch 58. Actuation of the relay causes hold-on contacts 64 and 65 to close whereby the relay 61 is kept actuated and hence the head 41' kept in parallel with the head 41 so long as the battery 46 supplies sufficient voltage. The additional record 39' can be adapted to superimpose upon the transmitted signal at predetermined intervals, e. g. before the commencement of the main signal and each repetition thereof, a further signal indicating that fire has broken out.

I claim:

Signal transmitting apparatus adapted to be carried on an aircraft having a general source of electric power and a microphone fitted therein, said apparatus comprising a frame for attachment to the aircraft, a unit removably mounted in said frame, means for jettisoning said unit from said frame, a record, means for recording signals upon said record, means for automatically obliterating superseded signals from said record, an internal source of power within said unit, a radio transmitter for transmitting signals recorded on said record, a releasable connector for connecting said unit to said microphone to enable signals given by the navigator of the aircraft from time to time to be recorded on said record and for connecting said general source to said unit, and means for disabling said obliterating means and for putting said internal source into use in response to jettisoning of said unit and for disconnecting said internal source when said unit is in said frame and signals derived from said microphone are required to be recorded on said record.

ARUNDELL WALLIS FAULKNER.

REFERENCES CITED

The following references are of record in the file of this patent:

UNITED STATES PATENTS

| Number | Name | Date |
| --- | --- | --- |
| 2,022,991 | Walter | Dec. 3, 1935 |
| 2,149,808 | Ellis | Mar. 7, 1939 |
| 2,310,017 | Canon et al. | Feb. 2, 1943 |
| 2,323,064 | Lustfield | June 29, 1943 |
| 2,328,208 | Friedman | Aug. 31, 1943 |
| 2,402,143 | Arenstein | June 18, 1946 |
| 2,470,783 | Mead | May 24, 1949 |
| 2,473,050 | Camp | June 14, 1949 |
| 2,500,809 | Fennessy et al. | Mar. 14, 1950 |